ELECTRICAL PULSE GENERATOR

Filed Dec. 24, 1963 2 Sheets-Sheet 1

INVENTOR
U. F. GIANOLA
BY Herbert M. Shapiro
ATTORNEY 3,308,453

ELECTRICAL PULSE GENERATOR

Umberto F. Gianola, Florham Park, N.J., assignor to Bell Telephone Laboratories, Incorporated, New York, N.Y., a corporation of New York

Filed Dec. 24, 1963, Ser. No. 333,137

5 Claims. (Cl. 340—347)

Figure 1:
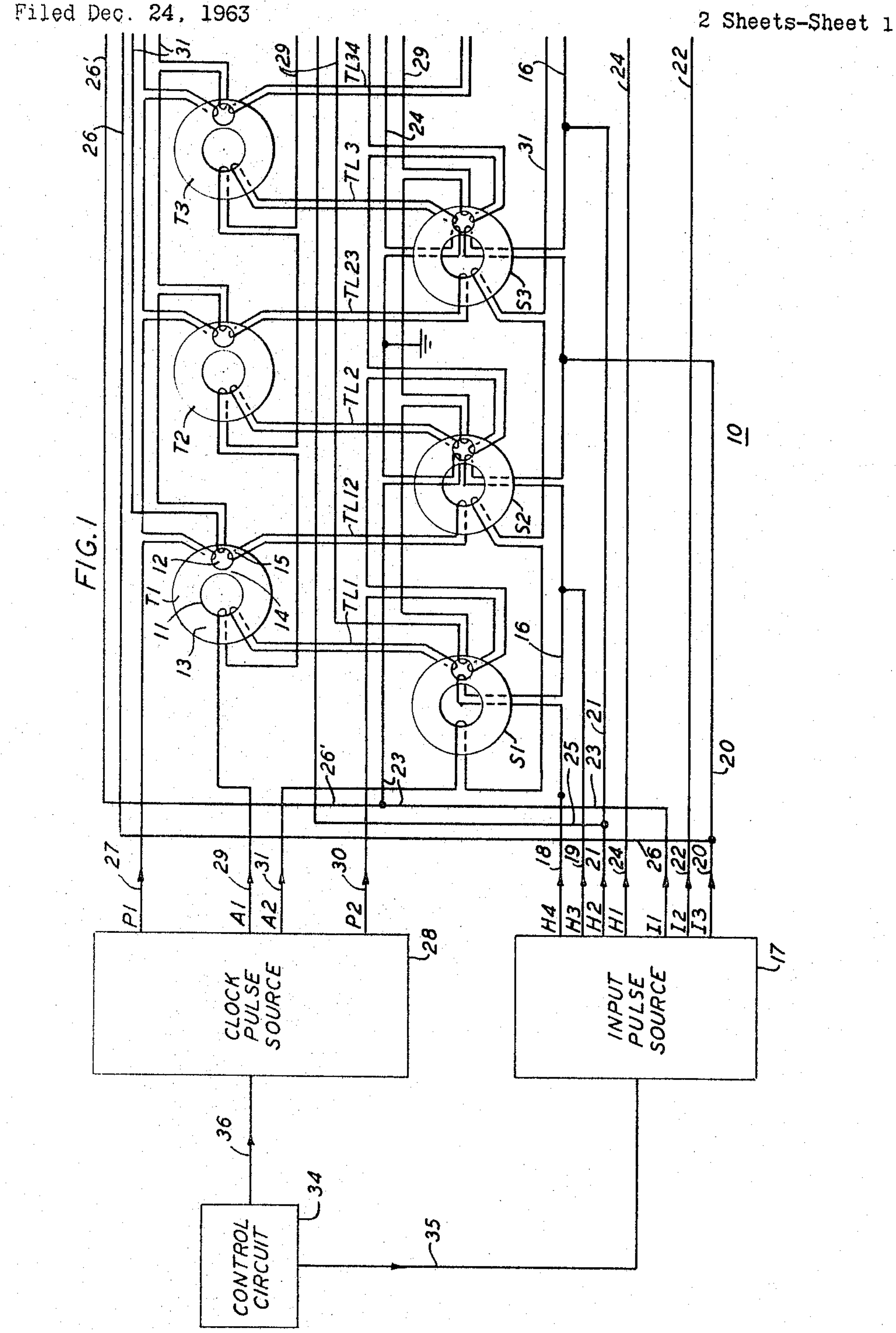

This invention relates to electrical signal generators, and, more particularly, to dial pulse generators for use, primarily but not exclusively, in connection with telephone subscriber subsets. As there used, a signal generator is controlled by the subscriber to transmit coded series of electrical pulses representative of the directory designation of the distant subscriber substation with which a connection is desired.

At the present time, the electrical pulses are generated, primarily, by periodically interrupting a closed direct-current circuit by means of pulsing springs in the telephone subset. The springs are controlled by the familiar finger controlled telephone dial which is operated in accordance with the digital information of the called line to produce a series of direct-current pulses which operate, in one telephone system, to control mechanical switches which, in turn, establish the desired connection between the calling and the called lines. The current pulses are delivered at about ten pulses per second; this pulse rate has been found suitable for operating the mechanical switching means encountered in most central offices today.

An effort is currently under way to avoid the inherent wear of mechanical switches and to increase substantially the pulse rate in order to reduce maintenance costs and to permit fewer common switching circuits to accommodate a greater amount of traffic, respectively. This effort is being implemented, primarily, by the installation of electronic central offices. In keeping with this effort, present telephone subscriber subsets are being replaced by the pushbutton type such as the new TOUCH-TONE telephones which emit a coded multifrequency signal each time a pushbutton is depressed. Although these telephones are ideally suited for operation with the electronic central offices, they must also be made compatible with existing central offices which can handle directly neither the multi-frequency signal output of the pushbutton telephone nor the rate at which such signals are typically emitted.

It is current practice for a central office to receive the multifrequency signal from a subscriber pushbutton subset by means of a multifrequency receiver which provides coded output pulses for introducing directly or, if necessary, via an intermediate buffer memory a single set state into a corresponding single stage of a stepping switch. The set state is shifted through the stepping switch thereby generating an output pulse each time the set state is shifted. Such a system is described, for example, in Patent No. 2,933,563, of L. A. Hohmann, Jr., issued April 19, 1960.

An object of the present invention is to provide a new and novel pulse generator for translating coded input information into output pulse sequences compatible with, for example, mechanical telephone system central offices.

A specific object of this invention is to provide a shift register register circuit for converting two-out-of-seven coded multifrequency signals into corresponding sequences of dial pulses.

The foregoing and other objects of this invention are realized in one illustrative embodiment in accordance with this invention which comprises a multistage shift register including a storage and a transfer multiapertured core per stage in an arrangement such as that described in Patent No. 3,045,215, of U. F. Gianola, issued July 17, 1962, plus an additional multiapertured core. A combinational input circuit couples all the storage cores, the transfer core of the terminal stage of the register, and the additional core in a manner to set, starting at the storage core of the terminal stage of the register, $n/2$ of the storage cores in response to an input coded signal corresponding to an even number $n$ to set $n/2$ of the storage cores plus the transfer core of the terminal stage of the register in response to an input coded signal corresponding to an odd number $n+1 \neq 5$, and to set $n/2$ of the storage cores and the additional core in response to a coded signal corresponding to the odd number $n+1=5$. Once the various cores are set, sequences of prime and advance pulses are applied to the shift register in a four-phase cycle of operation essentially as described in the aforementioned Gianola patent, until all the cores in the register and the additional core are in a clear state. The corresponding number of output pulses are realized by means of an output conductor coupling the storage and transfer core of the terminal stage of the register and the additional core for providing an output pulse in response to the resetting of any of the so coupled cores.

Thus, a feature of this invention is an input circuit coupled to the cores of a shift register in a manner to set the storage cores of $n/2$ stages in response to an input coded signal corresponding to an even number, to set the storage cores of $n/2$ stages plus the transfer core of the terminal stage of the register in response to an input coded signal corresponding to an odd number $n+1 \neq 5$, and to set the storage cores of $n/2$ stages plus the additional core in response to an input coded signal corresponding to the odd number $n+1=5$.

Another feature of this invention is an output circuit coupling the storage and transfer core of the terminal stage of a shift register and an additional core for providing a pulse therein in response to the resetting of any of the so coupled cores.

Figure 4:
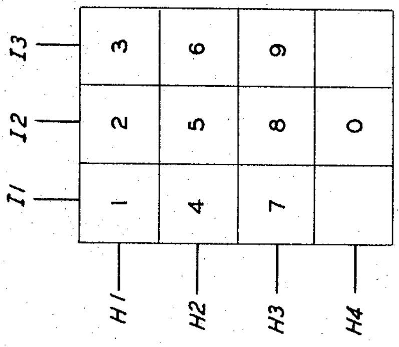
Figures 3A, 3B, 3C:
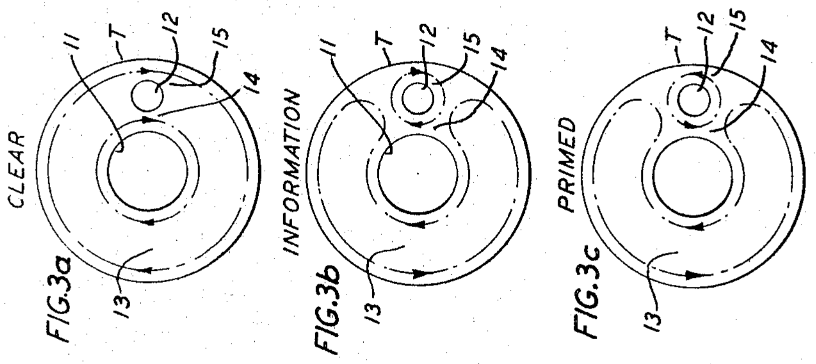
Figure 2:
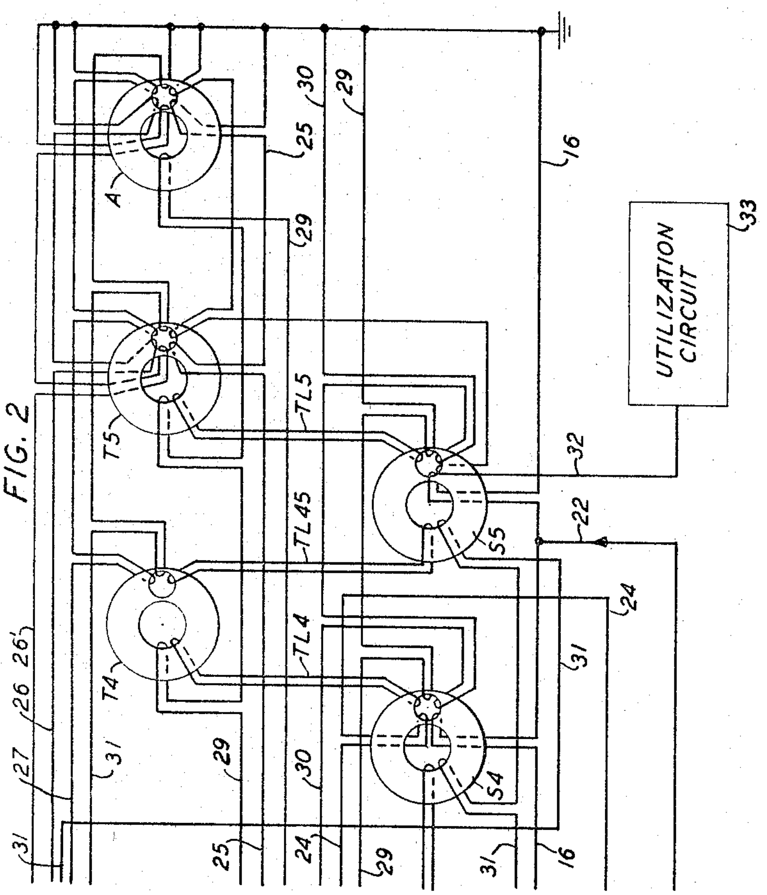

A complete understanding of the present invention together with the objects and features thereof can be gained by a consideration of the following detailed description taken in conjunction with the accompanying drawing in which:

FIGS. 1 and 2, considered together, depict, schematically, an illustrative embodiment of this invention;

FIGS. 3*a*, 3*b*, and 3*c* depict, schematically, the possible magnetic conditions to which the cores of the embodiment of FIGS. 1 and 2 are driven during an operation of the embodiment of FIGS. 1 and 2; and FIG. 4 illustrates, graphically, the face plate of a TOUCH-TONE dial showing a relationship between the button depressed and the corresponding current pairs applied to the illustrative embodiment of FIGS. 1 and 2 in response thereto.

An illustrative pulse generator 10 capable of translating coded parallel input signals to serial output pulses in accordance with this invention is shown in FIGS. 1 and 2 of the drawing when these figures are placed side by side in a manner made obvious by the identical marking of corresponding conductors in the two figures. The pulse generator comprises a shift register including an alternating series of multiapertured magnetic storage cores S1, S2, . . . S5, and transfer cores T1, T2, . . . T5. An additional core A follows the last of the series of transfer cores. A pair of neighboring storage and transfer cores bearing corresponding numeral designations are commonly thought of as constituting a stage of the shift register. The magnetic cores are advantageously of a well known ferrite material exhibiting a substantially rectangular hysteresis characteristic which is capable of remaining in either two conditions of magnetic remanence to which switched by an applied magnetomotive force.

Each magnetic core includes a single central aperture 11 and a smaller aperture 12 which define legs 13, 14 and 15. Legs 14 and 15 have substantially equal minimum cross-sectional areas; leg 13 has a cross-sectional area equal to at least twice that of either leg 14 or 15. All the magnetic cores are assumed herein to be subsantially identical, and, accordingly, the apertures and legs are designated only in connection with core T1.

A conductor 16, coupling serially, in the same sense, the leg 14 of each of the storage cores S1, S2, . . . S5, consecutively, is connected between an input pulse source 17, via a conductor 18, and ground. A plurality of conductors 19, 20, 21, and 22 are connected to the input, pulse source 17 at one end and to the conductor 16 between the cores S1 and S2, S2 and S3, S3 and S4, and S4 and S5, respectively, at the other end. A conductor 23, coupling leg 14 of storage core S2, is connected between input pulse source 17 and ground. A conductor 24, coupling, serially, in the same sense, legs 14 of storage cores S4 and S3, is connected between input pulse source 17 and ground. A conductor 25, coupling serially, in opposing sense, leg 14 of the transfer core T5 of the terminal stage of the shift register and leg 14 of the additional core A, is connected between input pulse source 17, via conductor 21, and ground. Conductors 26 and 26′ each coupling serially, in opposing sense, the legs 14 of transfer cores T4 and T5, are connected between input pulse source 17, via conductors 20 and 23, respectively, and ground. A conductor 27, coupling serially, in the same sense, the legs 15 of the transfer cores T1, T2, . . . T5, and the leg 15 of the additional core A, consecutively, between a clock pulse source 28 and ground. A conductor 29, coupling serially, in a first sense, the legs 13 of the transfer cores T1, T2, . . . T5, and the leg 13 of the additional core A, consecutively, and also coupling, in a second sense, the legs 15 of the storage cores S1, S2, . . . S5, is connected between clock pulse source 28 and ground. A conductor 30, coupling serially, in the same sense legs 15 of storage cores S1, S2, . . . S5, is connected between clock pulse source 28 and ground. A conductor 31, coupling serially, in a first sense, legs 13 of the storage cores S1, S2, . . . S5, consecutively, and also coupling, in a second sense, the legs 15 of the transfer cores T1, T2, . . . T5, and the leg 15 of the additional core A, is connected between clock pulse source 28 and ground. Each of a first plurality of transfer loops TL1, TL2, . . . TL5 couples the leg 15 of a storage core to the leg 13 of the transfer core of the same stage of the shift register; the coupling ratio of the transfer loop being preferably 2:1 to compensate for transfer loss and to insure complete flux reversal in each coupled leg 13. The transfer loops bear numeral designations corresponding to the numerals of the cores so coupled. Each of a second plurality of transfer loops TL12, TL23, TL34, and TL45 couples the leg 15 of a transfer core to the leg 13 of the storage core of the next succeeding stage of the shift register; here also the coupling ratio of the transfer loop is preferably 2:1. The transfer loops, advantageously, contain no other electrical elements and only the properties inherent in the loops, such as the internal resistance, will have any effect on the currents in the loop. A conductor 32, coupling serially, in the same sense, the storage core S5 and the transfer core T5 of the terminal stage of the register, and the additional core A, consecutively, is connected between utilization circuit 33 and ground. Input pulse source 17 and clock pulse source 28 are connected to control circuit 34 by means of conductors 35 and 36, respectively.

In operation, the magnetic flux in the various cores of the pulse generator of FIGS. 1 and 2 is driven into different configurations. FIGS. 3*a*, 3*b*, and 3*c* show a representative one of such cores designated T for convenience. Although so designated, the core is representative of any core in the register because all the cores are here assumed to be identical. Each leg 14 and 15 of the core T includes a single arrow as shown in the figure. The arrow represents the direction of flux and the flux capacity of the leg. Since all the legs 14 and 15 are assumed to have equal minimum cross-sectional areas, as indicated hereinbefore, they have equal flux carrying capacities. Accordingly, one arrow is shown in each leg, and may be thought of, conveniently, as representing a single unit of flux. The leg 13 which has twice the minimum cross-sectional area of leg 14 or leg 15 is shown as including two arrows. The direction of an arrow, that is, upward or downward as viewed in the drawing with respect to the legs, indicates the two remanent states for the leg designated. When all the flux in legs 13, 14 and 15 is in a clockwise direction about aperture 11, that is, when the arrows in legs 13 are directed upward, and the arrows in legs 14 and 15 are directed downward, the core is said to be in the clear state which is shown in FIG. 3*a*. When the flux in leg 13 is neutral and the flux about aperture 12 is directed clockwise, that is, when one arrow in leg 13 and the arrow in leg 14 are directed upward, and one arrow in leg 13 and the arrow in leg 15 are directed downward, the core is said to be in the information state, which is shown in FIG. 3*b*. When the flux in leg 13 is neutral and the flux about aperture 12 is directed counterclockwise, that is, when one arrow in leg 13 and the arrow in leg 15 are directed upward, and one arrow in leg 13 and the arrow in leg 14 are directed downward, the core is said to be in the primed state which is shown in FIG. 3*c*.

For a full understanding of the following description of an illustrative operation of the pulse generator of FIGS. 1 and 2, it will be helpful to visualize the face plate of the well known TOUCH-TONE pushbutton array which may serve as one origin of the coded input current pairs applied to the pulse generator. A schematic representation of the TOUCH-TONE face plate is shown in FIG. 4 and is understood to include an arrangement of buttons each bearing a digit from the number sequence 1 to 10, where a "0" represents the digit "10". In response to the depression of a button, two frequencies are produced by conventional means, not shown, and not comprising a part of this invention. These frequencies are transmitted to a conventional multifrequency receiver which converts each frequency pair to a current pair for storage, if necessary, in a buffer memory which along with the customary output amplifiers may comprise the immediate source of information (input pulse source 17) to the pulse generator of FIGS. 1 and 2. The current pairs corresponding to the individual buttons are shown in FIG. 4. The relation between the button depressed, the current pairs applied, in response thereto, to the pulse generator of FIGS. 1 and 2, the cores driven to the information state in response to the applied current pairs, and the number of output pulses realized are summarized in Table I and will be referred to in the description of the illustrative operation.

TABLE I

| Button Depressed | Current Pairs | Cores Set into Information State | Number of Output Pulses |
|---|---|---|---|
| 1 | H1 and I1 | T5 | 1 |
| 2 | H1 and I2 | S5 | 2 |
| 3 | H1 and I3 | S5 and T5 | 3 |
| 4 | H2 and I1 | S4 and S5 | 4 |
| 5 | H2 and I2 | S4, S5, and A | 5 |
| 6 | H2 and I3 | S3, S4, and S5 | 6 |
| 7 | H3 and I1 | S3, S4, S5, and T5 | 7 |
| 8 | H3 and I2 | S2, S3, S4, and S5 | 8 |
| 9 | H3 and I3 | S2, S3, S4, S5, and T5 | 9 |
| 0 | H4 and I2 | S1, S2, S3, S4, and S5 | 10 |

In light of the foregoing description of the organization of the pulse generator of FIGS. 1 and 2, the remarks concerning one possible origin of the coded input signals, and information representation in the pulse generator in accordance with this invention, a description of an illustrative operation thereof will now be presented.

In order to expedite the description, it is assumed that all the cores in the pulse generator of FIGS. 1 and 2 are initially in the clear state shown in FIG. 3*a*. The operation of the pulse generator will be specifically described for four current pairs applied to the pulse generator producing one, three, five, and eight output pulses in response thereto. These current pairs are designated H1 and I1, H1 and I3, H2 and I2, and H3 and I2, and, conveniently, correspond to the buttons, 1, 3, 5, and 8, on the TOUCH-TONE face plate as shown in FIG. 4.

An operation, in accordance with this invention, is initiated by activating the input pulse source 17 under the control of control circuit 34, both shown in block diagram form in FIG. 1, to apply to the pulse generator 10 of FIGS. 1 and 2 a coded input signal comprising a pair of currents, one from the set of currents designated H4, H3, H2, and H1, the other from the set of currents designated I1, I2, and I3. Since two currents are applied out of a possible seven currents, the input code is termed a "two-out-of-seven" (2/7) code. In this connection, pulse source 17 may be any pulse source capable of supplying pulses of a duration and amplitude for setting the various cores of the pulse generator of FIGS. 1 and 2 in accordance with this invention. One exemplary such pulse source is the word-organized "fluxor" memory of the type described in Patent No. 2,926,342 of J. L. Rogers, issued February 23, 1960, including a conventional output pulse amplifier. The control circuit 34, in this connection, may be any control circuit capable of activating the pulse source 17 and the clock pulse source 28 in accordance with a timed sequence. In accordance with the assumed illustrative operation, input pulse source 17 applies currents H1 and I1 to conductor 24 and to conductors 23 and 26', respectively; the various currents, for simplicity, will be assumed to be of positive polarity and of equal amplitude and duration for the purposes of the illustrative operation. The parallel circuit comprising conductors 23 and 26' includes an isolation network, not shown, for making the current splitting between the conductors essentially independent of the impedances in order to enable the same current to be applied to the conductors. Such isolating networks are well known and are, accordingly, omitted from the drawing. Alternatively, series circuit configurations which eliminate the need for isolation networks may be employed. It is necessary only that the coded input pulses be applied to the conductors of the input circuit in a manner to set the proper cores as described herein. A positive current H1 applied to conductor 24 tends to drive the flux in leg 14 of storage cores S4 and S3 downward. These cores, however, already are in the clear state shown in FIG. 3*a*, and their legs 14 include flux already directed downward. Consequently, there is no significant flux change in response to the current H1. A positive current I1 applied to conductors 23 and 26' tends to drive the flux in leg 14 of storage core S2 downward, the flux in leg 14 of transfer core T5 upward, and the flux in leg 14 of the additional core A downward. The transfer cores and the additional core are in the clear state with the flux in their legs 14 already directed downward. Accordingly, in response to the positive current I1 applied to conductors 23 and 26', the flux in leg 14 of core T5 is driven upward while no significant flux change results in the storage core S2 or the additional core A. Flux closure for the switched flux in leg 14 of transfer core T5 is via leg 13, the core being driven to the information state as shown in FIG. 3*b*. Thus, only core T5 is driven to the information state in response to the applied currents H1 and I1. In this connection, the input pulse source 17 is capable of delivering pulses having amplitudes sufficient to switch flux about the central aperture 11 of a core. The information, now set in the register, is stepped out serially in response to a four-phase cycle of operation as follows: Clock pulse source 28, shown in block diagram form in FIG. 1, is activated under the control of control circuit 34 for providing sequences of prime and advance current pulses designated P1 and A1 for advancing information from the transfer cores (and the additional core) to the storage cores, and P2 and A2 for advancing information from the storage cores to the transfer cores for stepping the information through the series of cores. In this connection, clock pulse source 28 may be any source of pulses capable of providing alternating prime and advance pulses in accordance with this invention. The pulse P1 is applied to conductor 27; in response, the flux in the leg 15 of each of the transfer cores T1, T2, . . . T5 is driven upwards. The prime pulse, however, has an amplitude insufficient to switch flux about the central aperture 11 of a core. Accordingly, flux closure for flux driven in a leg 15 of a core in response to the prime pulse P1 is, necessarily, by means of leg 14. The flux in leg 14 of the transfer cores T1, T2, . . . T4 already is directed downward and cannot provide the requisite closure. Thus, in response to the prime pulse P1, no significant flux changes occur in transfer cores T1, T2, T3, and T4 and these cores remain in the clear state. Transfer core T5, however, is, initially, in the information state. In response to the prime pulse P1, the flux state of core T5 is changed to the primed state shown in FIG. 3*c*; the output pulse in conductor 32 resulting from the change in the flux state of core T5 is proportional to the prime pulse and is insignificant as is well known; the various pulses induced in the transfer loops in response to the prime pulses result in no significant flux change in the next adjacent cores as is also well known.

The second pulse, A1, is applied to conductor 29 driving upward the flux in the legs 13 of the transfer cores T1, T2, . . . T5 and the additional core A, and, in addition, driving downward the flux in the legs 15 of the storage cores S1, S2, . . . S5. The transfer cores T1, T2, . . . T4, and the additional core A, are in the clear state, and, accordingly, their legs 13 are already saturated in the direction urged by the advance pulse A1; no significant flux change results. Similarly, the storage cores S1, S2, . . . S5 also are in the clear state, and, accordingly, no significant flux change results therein in response to the advance pulse A1. The transfer core T5, however, is in the primed state. In response to the advance pulse A1, the flux in leg 13 therein is driven upward driving the core T5 to the clear state, switching the flux in leg 15 thereof in the process. The switching of flux in leg 15 of transfer core T5 induces a positive pulse in the output conductor 32 for activating utilization circuit 33. Storage cores S5 and additional core A, also coupled by conductor 32, experience only insignificant shuttling of flux in response to this output pulse. In this connection, utilization circuit 33 may be any circuit capable of using one or more unipolar (negative) output current pulses in accordance with this invention. A reversal of the winding sense by which the output conductor couples the various cores enables the use of positive output pulses as is well known. For telephone applications, the utilization circuit may be, for example, any univibrator capable of being triggered by the output current pulses in accordance with this invention, and providing, in response thereto, dial (D.-C. current) pulses having a break and make ratio compatible with, for example, a step-by-step telephone central office. Further sequences of prime and advance pulses produce no further outputs; the sequences are thereupon terminated under the control of control circuit 34.

The foregoing description demonstrates that a particular current pair, which may advantageously correspond to the odd number one as shown in FIG. 4, when applied to the circuit of FIGS. 1 and 2, results in a single output pulse. The operation and results therefrom in response to another applied current pair, which may correspond to the odd number three, as shown in FIG. 4, will now be described.

It is to be emphasized that the sequence of prime and advance pulses is repeated until all the storage, transfer and additional cores are in the clear state; then additional information may be introduced. The introduction of information by means of input pulse source 17 and the provision of the requisite number of prime and advance sequences by means of clock pulse source 28 is under the control of control circuit 34.

Pulse source 17 is again activated under the control of control circuit 34 for applying currents H1 and I3 to conductor 24 and to conductor 26, respectively. Current I3 is applied, simultaneous, to conductor 16 via conductor 20. In this connection, an isolating network (not shown) is utilized as described hereinbefore. Current H1 tends to drive the flux in legs 14 of storage cores S3 and S4 downward. Cores S3 and S4, however, are in the clear state, and the flux in their legs 14 is already saturated in this direction. Consequently, no significant flux change results in cores S3 and S4 in response to the current H1. Current I2, applied to conductor 26, tends to drive the flux in legs 14 of transfer core T5 and additional core A upward and downward, respectively. Since both these cores are in the clear state, the flux in leg 14 of transfer core T5 switches, flux closure being provided through leg 13 driving the core to the information state. The additional core A experiences only insignificant shuttle flux excursions in response to current I3. Current I3 applied simultaneously to conductor 16 via conductor 20 tends to drive upward the flux in legs 14 of storage cores S3, S4, and S5. Current H1 applied to conductor 24 and acting as described hereinbefore, inhibits the flux in legs 14 of cores S3 and S4 from switching in response to current I3; the flux in leg 14 of core S5 switches. Thus, in response to the applied current pair H1 and I3, cores T5 and S5 are in the information state as noted in Table I.

The sequence of prime and advance pulses is applied as before in response to the activation of clock pulse source 28 under the control of control circuit 34. In response to the pulse P1, the flux in leg 15 of core T5 is driven upward, flux closure being provided through leg 14 driving the core to the primed state. In response to the pulse A1, the flux in leg 13 of core T5 is driven upward, flux closure being provided through leg 15 which switches downward driving the core to the clear state. The switching downward of flux in leg 15 of core T5 in response to pulse A1 induces a first output pulse in conductor 32 for activating utilization circuit 33. In response to pulses P2 and A2, core S5 undergoes the flux changes, described for core T5 immediately hereinabove, producing a second pulse in conductor 32. Leg 15 of core S5, in switching from the primed state to the clear state, induces a pulse in transfer loop TL5 which pulse drives the transfer core T5 to the information state. In response to the next sequence of P1 and A1 pulses, core T5, similarly, produces a third pulse in conductor 32. In response to additional prime and advance pulses no further pulses are induced in output conductor 32 because the remaining cores are in the clear state and experience only insignificant shuttle flux excursions in response to such pulses. Therefore, the current pair H1 and I3 produce three output pulses in conductor 32 as is indicated in Table I.

The current pair H2 and I2 produce five pulses in conductor 32 making use of the additional core A uniquely in this illustrative operation. Specifically, current H2 is applied to conductor 25 and, simultaneously, to conductor 16 via conductor 21. Here too, an isolating network is utilized as described hereinbefore. In response to the current H2, the additional core A and storage cores S4 and S5 are driven to the information state. Current I2, applied to conductor 16 via conductor 22 incidentally aids in driving core S5 to the information state. In response to the prime and advance pulses P1 and A1, the additional core A produces a first output pulse in conductor 32. In response to the pulses P2 and A2, the flux in each of cores S4 and S5 is switched from the information state to the primed state and then to the clear state. In switching to the clear state, the cores S4 and S5 induce pulses in transfer loops TL4 and TL5, respectively, driving transfer cores T4 and T5 to the information state. Storage core S5, also, in switching, induces a second pulse in conductor 32. During the next sequence of pulses P1 and A1, transfer cores T4 and T5 are driven into the clear state; core T5, in switching, induces a third pulse in conductor 32. Also, core T4, in switching, induces a pulse in transfer loop TL45 for driving storage core S5 into the information state. In response to the next sequence of pulses P2 and A2, storage core S5 is driven to the clear state, inducing a fourth pulse in conductor 32, and also inducing in transfer loop TL5 a pulse for driving transfer core T5 to the information state. In response to the next sequence of P1 and A1 pulses, core T5 is driven to the clear state, inducing, in switching, a fifth and final pulse in conductor 32.

In response to the current pair H3 and I2 applied to conductor 16 via conductors 19 and 22, respectively, storage cores S2, S3, S4, and S5 are driven, in the manner described hereinbefore, to the information state; the remaining cores are uncoupled by these circuits, and, accordingly, are unaffected by the pulses applied thereto. In response to successive pulse sequences P1 and A1, P2 and A2, P1 and A1, et cetera, the transfer cores are first driven to the clear state (all the transfer cores including core T5 initially are in the clear state in this instance) and information is then stepped alternately from the storage cores to the transfer cores, as described hereinbefore, producing an output pulse each time core S5 or core T5 is driven to the clear state from the information state; eight pulses (corresponding to the digit 8) are produced in conductor 32.

It is thus clear that for each storage core driven to the information state two pulses are induced in the output conductor in response to the subsequent prime and advance sequences. Therefore, $n/2$ of the storage cores are so driven for a current pair to produce an even number of, for example, $n$ output pulses. Also, for current pairs to produce an odd number of output pulses, for example, $n+1\neq 5$, where $n=0$, 2, 4, 6, and 8, only $n/2$ of storage cores are driven to the information state, along with the transfer core T5. In response to the prime and advance sequences, the terminal transfer core produces a single output pulse. The terminal storage core not only produces a single output pulse, but also enables the terminal transfer core to produce an additional pulse. For the odd number $n+1=5$, the additional core A provides the single output pulse in response to the prime and advance sequences, whereas each storage core produces one output pulse and enables another.

Each current of the yet undiscussed current pairs H1 and I2, H2 and I1, H2 and I3, H3 and I1, and H3 and I3 is individually applied to the various conductors as previously described to produce, in response to the prime and advance sequences, the corresponding number 2, 4, 6, 7, and 9 of output pulses, respectively, as called for in Table I. Of the current pair H4 and I2, corresponding to ten pulses and represented in FIG. 4 as a "0," current H4 is applied to conductor 16 via conductor 18 and current I2 is applied as described hereinbefore; ten output pulses are induced in the conductor 32 in response to the prime and advance sequences following the application of these pulses. Further stages may be provided by one skilled in the art for enabling additional numbers of output pulses and additional functions.

The operation has been described primarily in terms of the application of four current pairs to emphasize the unique operation of the pulse generator of FIGS. 1 and 2. In each instance, after the application of a current pair, the cores in the pulse generator are returned to the clear state by the prime and advance sequences prior to the introduction of the next current pair. For telephone applications, the normal sequence of, for example, seven digits (for local dialing) is applied to the pulse generator in the form of a timed sequence of discrete current pairs; in response to each current pair, information is stored as described, and, subsequently, read out serially as output pulses, corresponding to a prescribed digit, in response to the prime and advance sequences which return all the cores to the clear state in preparation for the next succeeding current pair. Interdigit timing and the initiation of successive read-out cycles is provided by conventional means not part of this invention conveniently comprising a portion of control circuit 34. One suitable means for providing the requisite interdigit timing is disclosed in the aforementioned Hohmann patent.

Although the invention has been described in terms of a multiapertured magnetic element, any bistable element may be used. In addition, although the invention has been described in terms of a shift register including a storage and a transfer core per stage, any shift register having parallel-to-series capabilities may be used.

What has been thus described is considered to be only an illustrative embodiment of this invention. Accordingly, various and numerous other arrangements may be devised by one skilled in the art without departing from the spirit and scope of this invention.

What is claimed is:

1. An electrical circuit comprising a plurality of first elements, a second element, and a third element, said elements being arranged consecutively and each having a clear and an information state, a first input circuit means coupled to said first elements for selectively setting $n/2$ of said first elements to said information state in response to a coded signal corresponding to an even number $n$ of a number sequence, a second input circuit means coupled to said first elements and said second element for selectively setting $n/2$ of said first elements and said second element to said information state in response to a coded signal corresponding to an odd number $n+1$ unequal to a selected one of the remaining numbers of said number sequence, a third input circuit means coupled to said first elements and said third element for selectively setting $n/2$ of said first elements and said third element to said information state in response to a coded signal corresponding to an odd number $n+1$ equal to the one remaining number of said number sequence, and a signal means connected to each of said input circuit means for applying coded signals thereto.

2. An electrical circuit as claimed in claim 1 also comprising means for switching each of said elements to said clear state, and output circuit means coupled to the last of said first elements, said second element, and said third element for generating an output signal responsive to said switching of any of said last mentioned elements.

3. In combination, a shift rgister including a series of alternating first and second elements having set and reset states and also including means for alternately resetting said first elements and said second elements, and means responsive to said resetting for setting the corresponding next succeeding elements, an additional element also having set and reset states, first input circuit means coupled to all of said first elements for setting $n/2$ of said first elements in response to a coded signal corresponding to an even number $n$, second input circuit means coupling all of said first elements and the terminal second element for setting $n/2$ of said first elements and the terminal second element in response to a coded signal corresponding to an odd number $n+1\neq5$, third input circuit means coupled to said first elements and said additional element for setting $n/2=2$ of said first elements and the additional element in response to a coded signal corresponding to the odd number $n+1=5$, signal means connected to said first second and third input circuit means for applying coded signals thereto, and output circuit means coupling the terminal first element, said terminal second element, and said additional element for providing an output pulse in response to the resetting of any one of the so coupled elements.

4. In combination, a multistage shift register including a first and a second element per stage, an additional element, each of said first and second elements and said additional element having set and reset stable states, first input circuit means coupled to all of said first elements for setting $n/2$ of said first elements in response to a coded signal corresponding to an even number $n$, second input circuit means coupling said first elements and the second element of the terminal stage of the register for selectively setting $n/2$ of said first elements and said second element of said terminal stage in response to a coded signal corresponding to an odd number $n+1\neq5$, third input circuit means coupled to said first elements and said additional element for setting $n/2=2$ of said first elements and said additional element in response to a coded signal corresponding to the odd number $n+1=5$, signal means connected to said first second and third input circuit means for applying coded signals thereto, means coupling the first and second elements of each stage for setting the so coupled second elements in response to the resetting of the corresponding first elements, means coupling the second elements of each stage with the first elements of the corresponding next adjacent stage for setting the so coupled first elements in response to the resetting of the corresponding second elements, signal means coupling said first and second elements for alternatingly resetting said first and said second elements, and output means coupling the first and second elements of said terminal stage and said additional element for providing an output signal in response to the resetting of any one of the last mentioned elements.

5. A combination in accordance with claim 4 in which said first, second, and additional elements are magnetic cores.

References Cited by the Examiner

UNITED STATES PATENTS 3,127,600 3/1964 Kaenel ---------------- 340—347

MAYNARD R. WILBUR, *Primary Examiner.*

K. R. STEVENS, W. J. KOPACZ, *Assistant Examiners.*